Patented July 18, 1933

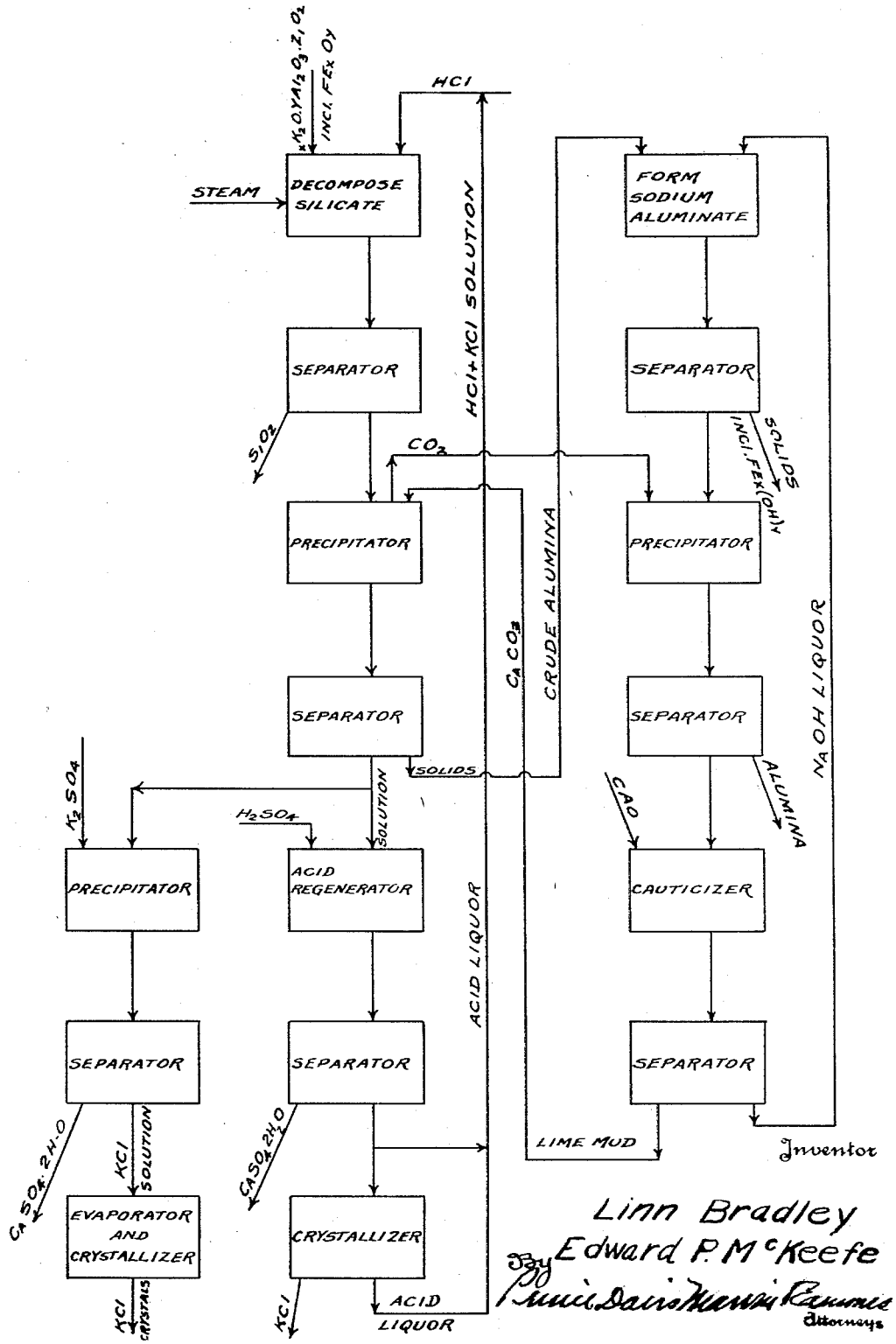

1,918,735

UNITED STATES PATENT OFFICE

LINN BRADLEY, OF MONTCLAIR, NEW JERSEY, AND EDWARD P. McKEEFE, OF PLATTSBURG, NEW YORK, ASSIGNORS TO BRADLEY-McKEEFE CORPORATION, OF NEW YORK, N. Y., A CORPORATION OF NEW YORK

TREATMENT OF ALUMINOUS MATERIALS

Application filed August 29, 1929. Serial No. 389,312.

This invention relates to the treatment of compounds of aluminium.

The invention also relates to improvements in the treatment of aluminous materials (e. g. materials which contain silica, alumina, etc., such as aluminium-bearing silicates such as clays, sericites, bauxites, furnace-slags, ashes from coal, leucites, etc.) whereby iron-free alumina may be obtained of a purity suitable for use as a raw material in the production of metallic aluminium.

The invention also includes a process for the treatment of alkaline residual liquors, which contain sodium compounds, such as black liquor of the soda process or the sulfate process or a similar process for separating organic matter from cellulosic fibre-bearing materials, although other alkaline residual liquors of generally similar composition and properties may be used.

More particularly, the invention relates to the treatment of raw materials which contain alumina, iron compounds, potash and silica, for the purpose of recovering alumina, potash and silica in condition such that they can be made commercially available for such uses as they may be suitable. The invention includes a process for dissolving alumina, iron and potash by means of an acid, separation of these ingredients from the silica, separation of the alumina from the iron and the potash, and separation of the potash from the alumina and the iron.

This application is a continuation in part of our application, Serial No. 470,962, filed May 19, 1921 now Patent No. 1,821,138, and contains subject matter taken therefrom.

According to one embodiment of the invention, a potash-bearing aluminium silicate is treated with hydrochloric acid so as to dissolve substantially all of the alumina, iron, alkali metals, alkaline earth metals such as magnesium and calcium, leaving the silica undissolved. The resulting solution is separated from the undissolved matter. The solution is treated with calcareous material including calcium carbonate so as to precipitate the alumina and the iron (and also titanium if present) and to convert most of the calcium into calcium chloride which is then in the solution which contains the potassium chloride. The solution containing the calcium chloride, etc. is separated from the crude alumina precipitate. If desired, this precipitate can be washed with water and the washings added to the solution.

The precipitate is treated with a solution comprising sodium hydroxide so as to dissolve the alumina to form an aluminate of sodium, leaving the iron and titanium compounds undissolved. If desired the ferrous iron, if any, can be oxidized to ferric iron so as to more completely separate the alumina from the iron. The alkaline liquor containing the aluminate is separated from the undissolved matter which contains the iron, and later this alkaline liquor is treated to recover the alumina therefrom. Thus the alkaline liquor can be treated with carbon dioxide so as to convert some of the soda content of the liquor into sodium carbonate and to precipitate the alumina. The resulting liquor is separated from the precipitated alumina. This precipitate may be washed with water and the washings added to the alkaline liquor. The washed precipitate may be treated to remove water and the solids heated to obtain the alumina in a purified condition, e. g. as aluminium oxide.

The alkaline liquor can be treated with calcium hydroxide to convert sodium carbonate into sodium hydroxide to the desired extent, thereby forming a lime mud which contains calcium carbonate. This mud may be washed with water and the washings added to the alkaline liquor. This washed lime mud may be used in treating the liquid obtained by treating the aluminum silicate with hydrochloric acid, as described above. If desired or if necessary additional calcium carbonate or/and dolomite may be added for treatment of the last mentioned liquor. Such carbon dioxide as is set free by this treatment may be recovered in relatively concentrated state and it may be used in the carbonating treatment referred to above in which the aluminate solution is treated to precipitate the alumina and to form sodium carbonate. The calcium chloride containing liquor may be treated with sulfuric acid in amount sufficient to convert substantially all of the calcium chloride into calcium sulfate and hydrochloric acid. The calcium sulfate crystals can be separated from the hydrochloric acid and the calcium sulfate may be washed with a small amount of water and the washings added to the solution. The hydrochloric acid in the solution may be used to treat another batch of aluminous material such as a clay, sericite, etc., and the cycle may be repeated. Suitable compounds may be added at suitable points in the cycle for replenishing losses.

The sodium hydroxide containing liquor used for treating the crude alumina precipitate may be obtained in any suitable manner. It may be prepared by dissolving sodium carbonate in water and causticizing the sodium carbonate solution so as to obtain the sodium hydroxide in solution in any suitable manner. Thus the cycle may be operated in the manner outlined above.

In order to make commercially feasible the treatment of potash-bearing aluminium silicates to recover valuable materials therefrom, it is desirable to recover both the potash and the alumina in merchantable condition and of such purity and concentration that they will command suitable prices. Further, if the silica can be recovered in a form and condition such that it can also command a suitable price and be available for use in a field that is capable of consuming large tonnages of such silica, then these silicates can be treated commercially on a large scale. The rapid depletion of the deposits of high grade bauxite is calling for a commercially sound process for treating the silicates as a source of alumina. Many of the silicates contain fairly large percentages of potash. Since an acid is required for recovering the alumina from the silicates, it is desirable to have the acid radicle combined with some base so that it can be marketed at a fair price and in large tonnages. According to the present invention, potash-bearing silicates, lime, limestone and sulfuric acid may be introduced into the system as raw materials, and as a result of the process, purified alumina, a potassium salt, silica of high grade and gypsum of high grade can be marketed. Most of the soda used in the process can be recovered.

The following examples, which are given in sufficient outline to enable those skilled in the art to carry them out in practice, will further illustrate the invention in some of its aspects.

*Example 1.*—High grade potash-bearing silicates, of relatively low iron content, and containing but little if any organic matter, such for example as sericite obtainable in Georgia, are obtained in finely divided condition in any suitable manner as by grinding, etc. The raw material may be given a preliminary heating or calcining treatment, if desired, before treating it with acid. This raw material is admixed with a solution of hydrochloric acid in such amount and of such concentration that substantially all of the iron, potash and alumina can be dissolved away from the silica. In order to facilitate rendering these ingredients soluble in the acid liquor, a small amount of sodium fluoride or other suitable fluoride may be added to the acid liquor for the purpose of facilitating the decomposition of the silicate by the acid. The mixture is heated, and preferably agitated, until the silicate has been decomposed to the desired extent. It is desirable to limit the amount of hydrochloric acid so that the liquor at the termination of this treatment contains but little if any free hydrochloric acid. However, the liquor will be of acid reaction owing to the presence of chlorides of aluminium, and iron if iron is present. Most of the silica remains undissolved. If the raw material was free from grit, etc., the resulting silica will be free from grit. If substantially all iron and organic matter (if any present) are obtained in solution in the acid liquor, the silica will be of relatively light color in most instances at least. The acid liquor is separated from the silica in any suitable manner.

The treatment of the raw aluminium silicate can be carried out in suitable acid-resistant apparatus and at suitable temperatures up to around 100 deg. C., more or less, and under atmospheric pressure or under increased pressure as may be desirable or necessary. The silica may be washed with water and the washings added to the acid liquor. In order to obtain the silica in better condition for use as a paper filler, in case it is still dark with organic matter after it has been washed, the washed silica can be subjected to a bleaching treatment. An advantageous method is to treat the silica with a solution of sodium permanganate or/and potassium permanganate, either with or without a soluble hypochlorite, and to heat the mixture of the silica and the bleaching liquor so as to decompose organic matter (if any) present in the silica; then the silica may be washed and thereafter treated with a solution of sulfurous acid or with a sulfite and an added acid such as hydrochloric acid so as to dissolve or to render soluble any colored manganese compounds and thereafter the bleached silica may be washed and dried to prepare it for use as a paper filler in lieu of kaolin.

The acid liquor containing the aluminium chloride, potassium chloride and iron chloride is treated with calcium carbonate in amount sufficient to precipitate substantially all of the alumina and iron, leaving the potassium chloride in the liquor along with the resulting calcium chloride. It is desirable to limit the amount of calcium carbonate to such an amount that the precipitate of the crude alumina will contain little if any undissolved calcium compounds. If desired, calcium hydroxide can be substituted for some of the calcium carbonate. However, calcium carbonate should generally be used in sufficient amount to yield enough carbon dioxide for the subsequent carbonating treatment in which a solution comprising sodium aluminate is treated with available carbon dioxide so as to precipitate the alumina from the liquor, after the alumina has been separated from iron.

The crude alumina precipitate, referred to above, is washed with water, preferably countercurrently so as to limit the amount of washings produced, and the washings are added to the liquor containing the calcium chloride and the potassium chloride. If desirable or necessary, this liquor may then be subjected to a concentrating treatment to remove a regulated amount of water, as by an evaporation treatment in a multiple-effect evaporator. The concentration may be carried to a point which is suitable for treatment of the liquor with sulfuric acid to convert most of the calcium content of the liquor into precipitated calcium sulfate and permit of the ready separation of the resulting hydrochloric acid from the precipitated calcium sulfate in a concentration suitable for use on another batch of aluminium silicate. The potassium chloride remains in the liquor. The calcium sulfate crystals may be washed with a small amount of water, preferably countercurrently, and the washings added to the acid liquor.

In order to prepare the calcium chloride-containing liquor for the concentrating treatment, in case it is acid after it is removed from the crude alumina, it may be treated with an alkaline reagent such as calcium hydroxide or/and sodium hydroxide, etc., and the liquor may be clarified, e. g. by filtering.

The acid liquor which contains the potassium chloride and the hydrochloric acid is employed to treat another batch of the potassium-bearing aluminium silicate, in the manner above disclosed, and the process is repeated. In this way it is possible to build up the concentration of potassium chloride in the solution, a sufficient amount of hydrochloric acid being supplied to the liquor for the purposes specified. Any additional hydrochloric acid needed may be supplied in any suitable manner.

When the process has been carried for a sufficient number of times to warrant treating the liquor to recover the potassium chloride, the liquor which contains calcium chloride and potassium chloride may be concentrated until potassium chloride separates out and the mother liquor which contains the calcium chloride may be separated from the potassium chloride. The latter may be washed with a small amount of cold water, countercurrently being preferred, and the washings may be added to the mother liquor. The mother liquor may be diluted with a weaker liquor or with water, e. g. with washings from the washing treatment of the crude alumina of another batch. Then the diluted calcium chloride containing liquor may be treated with sulfuric acid to convert the calcium chloride into calcium sulfate and hydrochloric acid and the process again carried out.

Alternatively, the liquor which contains calcium chloride and a relatively large amount of potassium chloride may be treated with potassium sulfate in amount sufficient to convert the calcium chloride into calcium sulfate and potassium chloride, the former being separated from the liquor as crystals and the latter being left in the mother liquor. The latter liquor, after being separated from the undissolved matter, may be concentrated and the potassium chloride recovered. It may be purified in any suitable manner, if needed, to prepare it for the market. The potassium sulfate, if any is used, may be supplied in any suitable manner. It may be obtained by a modification of the process described in this example.

The crude alumina, referred to above, is treated with a liquor which contains sodium hydroxide under conditions adapted to dissolve substantially all of the alumina to form an aluminate of sodium and to leave substantially all of the iron and titanium compounds undissolved. The alkaline liquor is separated from the undissolved solids, and if desired these solids may be washed with water and the washings added to the alkaline liquor. The alkaline liquor may be clarified in any suitable manner. This clarified liquor may then be carbonated with the carbon dioxide set free as a result of the reaction between the acid liquor, which contains the chlorides of aluminium, iron and potassium, and the calcium carbonate. Any additional carbon dioxide, if required, may be supplied in any suitable manner, care being taken to avoid contamination of the alumina with undesirable impurities. The carbonation may be carried to such an extent that substantially all of the alumina is thrown out of the liquor, thereby forming some carbonate of sodium. It is advisable to terminate the carbonating treatment when a sufficient amount of alumina has been thrown out to accomplish the desired separation of the alumina from the liquor.

Alternatively, instead of carbonating the liquor to throw out alumina, any other suitable means of recovering the desired amount of alumina from the liquor may be employed, and the liquor may be adjusted as to composition, concentration, temperature, etc., for the recovery of the alumina. For example, the alkaline aluminate liquor may be treated with sulfur dioxide or with sodium bisulfite or both to convert the soda into a sulfite of sodium and to cause separation of the alumina from the liquor. The resulting liquor may be separated from the precipitated alumina and the sulfite of sodium may be used in a digesting treatment of cellulosic-fibre-bearing material, e. g. wood, to produce a pulp or a pulp-forming material, such as semi-chemical pulp for instance. The liquor resulting from the latter treatment may be treated to remove water, carbonize the organic matter and to recover the soda in the form of sodium carbonate and sodium sulfide. The latter may be used to produce the caustic liquor which is used for treating the crude alumina to form the aluminate. If desired, the sodium sulfide may be decomposed in any suitable manner, e. g. by carbonation to remove $H_2S$, and the resulting liquor may be treated with lime to convert sodium carbonate into caustic.

The alumina which is separated out from the alkaline aluminate containing liquor, may be washed to remove sodium compounds and these washings may be added to the resulting alkaline liquor. Also the washings from washing of the lime mud resulting from the causticizing treatment of the sodium carbonate containing liquor with lime to produce the caustic liquor, may be added to the alkaline liquor. This alkaline liquor may be subjected to a concentrating treatment to remove a desired amount of water, either before or after the causticizing step of the process. In case any soluble sodium compounds accumulate in the alkaline liquor and which would tend to interfere with the continued operation of the cycle, they can be removed in any suitable manner. Thus if sodium sulfate, sodium sulfite or/and sodium chloride should build up to an objectionable degree, the excess of such compound or compounds can be removed from the liquor by desalting evaporators after the causticizing treatment to convert sodium carbonate into sodium hydroxide. The concentrated liquor, after removal of the excess of such compound or compounds, can be diluted with washings or/and with water so as to bring the liquor to a suitable concentration for the treatment of the crude alumina precipitate referred to above. If soluble organic matter builds up in the soda-containing liquor to an objectionable point, the liquor may be treated to remove water, the organic matter carbonized and the sodium carbonate, etc. may be dissolved away from the resulting carbon.

The washed lime mud, from the causticizing treatment, is used to advantage in the treatment of the chloride-containing liquor, to separate the alumina and iron from the potash and to provide carbon dioxide for the carbonating treatment. Any excess of carbon dioxide over requirements, if any, can be used for any other suitable purpose, e. g. for decomposing sodium sulfid to remove hydrogen sulfide and form a carbonate of sodium. It is desirable to carry out the causticizing treatment of the sodium carbonate liquor in such manner that all or substantially all of the lime used is converted into calcium carbonate, so that little if any calcium hydroxide will be present in the mud when it is used to treat the chloride-containing acid liquor, thus providing a relatively large amount of carbon dioxide in such treatment. In order to accomplish this desired conversion of the lime into calcium carbonate, we have found it desirable to employ in the causticizing treatment the process described in our application Serial No. 143,104, filed Oct. 20, 1926, in which the causticizing operation is carried out on the countercurrent principle. We prefer to use calcium carbonate in finely divided form, such as a lime mud which contains but little if any calcium hydroxide, in treating the chloride-containing liquor. The relatively large amount of carbon dioxide thus made available can be used to advantage in a carbonating step of the process; thus a part of it can be used to carbonate the aluminate liquor and a part can be used to decompose sodium sulfide if any is produced. The treatment of wood with liquors which contain a sulfite of sodium, to produce pulp or a pulpy material, and the treatment of residual liquors to form sodium carbonate and sodium sulfide and the treatment of these latter compounds to decompose sodium sulfide by means of carbon dioxide so as to remove hydrogen sulfide, are described in our application Serial No. 686,137, filed January 14, 1924. Such processes can advantageously be carried out in combination with or in conjunction with the present process.

*Example 2.*—The process may be carried out in a manner similar to that described under Example 1, but with the difference that nitric acid is used to treat the potash-bearing silicate (or other suitable silicate) instead of using hydrochloric acid. The liquor resulting from the treatment of the silicate may therefore contain nitrates of potassium, aluminium, iron, etc. When this acid liquor is treated with the calcium carbonate, the alumina and the iron will be precipitated if enough calcium carbonate is used, and the resulting liquor will contain potassium nitrate and calcium nitrate. The liquor can be separated from the crude alumina, etc. and this liquor can be treated with sulfuric acid to convert the calcium nitrate into calcium sulfate precipitate and nitric acid in the solution. The potassium nitrate can be left in the liquor. The acid liquor is separated from the calcium sulfate and is used to treat another batch of the silicate, so as to build up the potassium nitrate in the liquor. When enough has accumulated after several cycles, the potassium nitrate can be crystallized out of the liquor, leaving calcium nitrate in the mother liquor. The mother liquor is treated, after removal of the surplus of potassium nitrate, with sulfuric acid to form the calcium sulfate and the nitric acid. Otherwise, the treatment is similar to that in Example 1.

Alternatively, the liquor which contains potassium nitrate and calcium nitrate can be treated with potassium sulfate to convert the calcium nitrate into calcium sulfate and the potassium sulfate into potassium nitrate. The calcium sulfate can be separated from the potassium nitrate and the latter can be recovered for the market. It may be treated to purify it, if needed, in any suitable manner. Nitric acid can be supplied to the system in any suitable manner to replace losses and other removals of the nitrogen or nitrate content from the system.

Another modification comprises treating sodium nitrate with sulfuric acid to form sodium sulfate or bisulfate and nitric acid. The nitric acid is used to treat the silicate. The nitrate liquor is used to treat calcium carbonate to throw out crude alumina. The calcium nitrate and the potassium nitrate after one or more cycles can be recovered as these compounds and marketed as such.

*Example 3.*—The silicate, for example, containing potash, aluminium, silica, and iron, is treated directly with sulfuric acid to obtain the potash, alumina and iron in an acid liquor in the form of sulfates. The liquor is separated from the silica. The liquor is treated with an alkaline material to precipitate the alumina and iron. Thus the sulfate-containing liquor may be treated with sodium carbonate, sodium hydroxide, calcium hydroxide, calcium carbonate, etc., or mixtures of two or more of these compounds. If sodium compound is used, the sulfate of sodium will be formed and the crude alumina thrown down. If calcium compound is used, the crude alumina will be admixed with calcium sulfate. When the sodium compound is used, the crude alumina can be treated with the sodium hydroxide containing liquor in the manner described in Example 1.

When the calcium compound, e. g. lime mud from the causticizing step of the process, is used to throw down the crude alumina, the mixture of alumina, iron and calcium compounds can be treated with a liquor which contains sufficient sodium hydroxide to dissolve the alumina. This liquor may also, if desired, contain sufficient sodium carbonate to react with all of the calcium sulfate so as to convert the calcium sulfate into calcium carbonate and to form sodium sulfate in the liquor. After separating the alkaline aluminate liquor from the undissolved compounds, it can be treated with carbon dioxide, or other suitable material, to throw down a purified alumina in a manner similar to that described in Example 1. The sodium sulfate in the treated liquor can be removed from the liquor if desired, as by concentration and crystallization, or in any other suitable manner.

When calcium carbonate or/and calcium hydroxide is used to treat the acid sulfate-containing liquor resulting from treatment of the silicate directly with sulfuric acid, the treated liquor will contain potassium sulfate. This potassium sulfate-containing liquor may be fortified with sulfuric acid and the liquor used to treat another batch of the silicate, and the process repeated until the liquor contains enough potassium sulfate to warrant recovery. The liquor, after removing the alumina may then be treated to recover the potassium sulfate in any suitable manner.

Alternatively the solution which contains the potassium sulfate may be used to treat a liquor containing calcium chloride and potassium chloride as produced by the process of Example 1, or/and a liquor which contains calcium nitrate and potassium nitrate as produced by the process of Example 2, the treatment being adjusted so that substantially all of the calcium content of the liquor or liquors is thrown out as calcium sulfate precipitate, leaving the potassium content of the liquor or liquors in solution as potassium chloride or/and potassium nitrate. The compound or compounds of potassium may be recovered from the solution in any suitable manner and may be marketed as potassium chloride or/and potassium nitrate.

It will be seen, therefore, that the process may be operated in various ways and in various combinations so as to obtain such results as may be desirable. The process is capable of numerous variations in each example, as well as various combinations in which two or more of the examples are used. Various raw materials can be used, and the process may be adjusted so as to obtain various products for the market.

The crude alumina precipitate may advantageously be treated with an alkaline residual liquor such as black liquor from the soda process, when such liquor contains sufficient sodium hydroxide. Additional sodium hydroxide may be added to black liquor to increase its content of this compound and the fortified liquor may be used to treat the crude alumina precipitate. This process combines the treatment of the black liquor with the treatment of the aluminous materials.

In the soda pulp process, the chipped wood is subjected to digestion with caustic soda of a strength of about 10.5 to 11.5 Bé., and containing about 92% of the soda as caustic soda (the remainder being sodium carbonate). About 900 gallons of the caustic soda solution are used per cord of wood (measured before chipping), and the digester is heated by direct steam at a pressure which varies from about 90 to 140 pounds, and for a suitable period of time, for example, from 3½ to 5 hours. The liquor is circulated within the digester by the steam during the digestion or cooking. The strength of the liquor and the time of treatment will vary somewhat according to the kind, quality and condition of the wood treated. The caustic soda solution used in the cooking operation is commonly made from soda ash by causticizing a solution thereof with lime. The digester is "blown" at the end of the cook and the pulp is separated from the black liquor and is washed with water. The black liquor separated from the pulp is commonly mixed with a certain amount of the wash water and the mixture constitutes what is commonly referred to as black liquor.

During the digestion in the soda pulp process a very considerable amount of the materials of the wood is dissolved so that the black liquor contains a considerable amount of organic matter in solution, and various sodium compounds. The black liquor thus commonly carries about 11 to 11½ grams of solids per 100 cc., and the total soda in the liquor is equal to about 5.75 percent of sodium carbonate, this determination being made by permitting 100 cc. of the liquor to dry and igniting the residue, burning off the organic matter and leaving the sodium carbonate behind.

The common method of treating the black liquor has been to evaporate a part of the water in evaporators and then feed the concentrated black liquor into an incinerator, the common type being a rotary furnace. The black liquor is further concentrated in the rotary furnace and finally burned, the organic matter being decomposed, and the inorganic matter being concentrated in the black ash, particularly in the form of sodium carbonate. The black ash is then treated with water to dissolve the sodium compounds away from the insoluble residue of carbon, etc., and the resulting solution, after suitable clarification, and after the addition of a further amount of soda ash, to make up for losses which are usual in the soda process (amounting to as much as 15%), as causticized with lime. The soda is thus converted, as far as is practicable, into sodium hydroxide or caustic soda. The lime mud is allowed to settle and the clarified solution of caustic soda is drawn off to be used in the digester. The lime mud is wasted, together with a small percentage of sodium compounds. The organic constituents of the black liquor are consumed or carbonized in the rotary furnace. The only constituents of the black liquor which are commonly recovered are the sodium compounds, the organic constituents of the liquor being lost, together with a small part of the sodium compounds.

According to one specific embodiment of the present invention, valuable constituents, in addition to soda, may be recovered from black liquor, and the treatment of the black liquor is carried out in conjunction with the production of alumina from aluminous materials, so that constituents present in or added to the black liquor contribute to the alumina production in a particularly advantageous manner.

The black liquor from the soda pulp process usually contains a considerable amount of soda in the form of free caustic soda. The black liquor also contains considerable amounts of organic material in solution, in combination with sodium as sodium organic compounds. In addition, the black liquor generally contains some sodium carbonate, organic salts such as sodium acetate, etc., and also some fermentable sugars. According to the present invention, we take advantage of certain of these constituents of the black liquor and utilize them in the treatment of aluminous material and the production of alumina, as hereinafter more fully described.

As the source of the alumina finally produced, we may take clay, preferably with a low iron content, and as free as possible from grit, and treat it with an acid such as sulfuric acid, sulphurous acid, phosphoric acid, nitric acid or hydrochloric acid, to dissolve the alumina content of the clay. Even a dilute acid solution will dissolve the alumina if the solution contains a small amount of soluble fluoride. The resulting solution can be separated from the silica which remains in a precipitated or insoluble form. If hydrochloric acid is used for treating the clay, the resulting solution of aluminum chloride may be treated with calcium hydroxide or calcium carbonate, preferably in a finely divided state. If calcium carbonate is used, carbon dioxide will be given off and may be recovered for use in a later state of the process.

The treatment of the aluminum chloride solution with calcium hydroxide or carbonate gives a precipitate which contains the alumina probably in the form of a basic aluminum carbonate if calcium carbonate has been used, or in the form of aluminum hydroxide if calcium hydroxide has been used, while the calcium goes into solution as calcium chloride. The precipitated aluminum compound is separated from the calcium chloride solution, washed free from calcium chloride and is used for addition to the black liquor, as hereinafter described.

The calcium chloride solution can be treated with sulfuric acid or nitre-cake (acid sodium sulfate) to regenerate a solution of hydrochloric acid, or a solution of hydrochloric acid and sodium chloride, for use in treating further quantities of clay, while the calcium will be precipitated as calcium sulfate or gypsum. The gypsum can thus be obtained in a merchantable form. The silica of the clay is obtained as an acid washed precipitated silica and is an excellent material for use as a paper filler and for other purposes, such as a heat insulator, a filtering medium, for fire-resisting paints, etc. The silica can be used either alone or mixed with part or all of the gypsum, e. g., for use as a paper filler. If the clay is treated with sulfuric acid, the alumina can be directly precipitated as a basic precipitate, either in admixture with gypsum, in case lime or calcium carbonate is added to the aluminum sulfate solution, or the basic aluminum compound can be otherwise precipitated without admixture with gypsum.

The precipitated aluminum hydroxide or basic aluminum carbonate, obtainable as above described preferably free from calcium sulphate is added to the black liquor in sufficient amount to combine with the free caustic soda of the black liquor, that is, adding such an amount of the basic aluminum precipitate as the free caustic soda will take into solution as sodium aluminate. Advantage is thus taken of the uncombined caustic soda of the black liquor for the production of a solution of sodium aluminate in the liquor. Such iron and titanium compounds as may be present will remain in an insoluble state, and can be separated from the solution by filtration. The filtered or clarified black liquor thus remaining will contain the sodium aluminate, as well as sodium organic compounds, etc. This liquor may then be treated with carbon dioxide, which may advantageously be that given off when the aluminum chloride solution was treated with calcium carbonate, or carbon dioxide obtained from any other suitable source, such as furnace gases, etc. or sodium bicarbonate may be added directly to the liquor.

The treatment of the liquor containing sodium aluminate with carbon dioxide brings about precipitation of the alumina from solution, with conversion of the sodium aluminate into sodium carbonate. The treatment of the liquor with carbon dioxide will also decompose part of the sodium organic compounds and precipitate organic matter from solution in intimate admixture with the precipitated aluminum hydroxide. That is, the carbonation of this liquor will give an intimately admixed precipitate of aluminum hydroxide and organic matter, while the sodium will be converted to a corresponding extent into sodium carbonate.

The composite precipitate of aluminum hydroxide and organic matter thus obtained is of particular value for use for the production of aluminum, for the reason that it contains the alumina purified from inorganic impurities and admixed with organic matter. By submitting the composite precipitate, after suitable washing to remove admixed and adhering liquor and sodium salts, to destructive distillation, the organic matter will be decomposed and carbonized and will give carbon mixed with alumina. This admixed carbon and alumina is well adapted for addition to the fused bath used in the electrolytic process for the production of metallic aluminum.

The liquor remaining after the precipitation of organic matter and alumina from the liquor referred to above will contain practically all of the original soda, largely in the form of sodium carbonate or bicarbonate, which is causticizable with lime to regenerate caustic soda in solution for further use in the soda pulp process.

Owing to the removal of much of the organic matter originally contained in the black liquor, the resulting liquor can be more readily evaporated without objectionable foaming and the evaporation can be carried to a much further degree than when untreated black liquor is evaporated. The concentration of the solution can thus be carried to such a degree as will correspond to the strength of the solution used originally in the digester; or the solution can be still further concentrated to give a more concentrated solution. A further amount of soda can then be added to the concentrated liquor, if necessary, for example, in the form of soda ash or other causticizable sodium compound to make up for losses, and the solution can then be causticized by treatment with lime; or caustic soda can be added to the liquor after it has been causticized; to make up for losses.

The causticizing treatment results in the conversion of the lime into insoluble calcium carbonate which can be separated and recovered by filtration or otherwise, leaving the causticized liquor which can then be used, after further concentration if necessary, in the treatment of further amounts of wood chips in the digester, or for other purposes.

Instead of first concentrating the liquor after the removal of organic matter and alumina, and then causticizing the concentrated liquor with lime, we may first causticize the liquor before concentration, although we regard the causticizing after concentration as more advantageous and as ordinarily to be recommended. The wash water from the washing of the precipitated organic matter and alumina can be admixed with the liquor from which the organic matter and alumina were precipitated, and the mixed liquors treated together by concentration and causticizing or vice-versa, or the wash water can be separately treated or otherwise used.

The black liquor contains a considerable amount of sodium acetate, etc. We have found that the amount of sodium acetate etc. is such that it can be profitably and advantageously recovered without preventing the subsequent reuse of the causticized liquor for carrying out further digestion of the wood chips. We have found that if the causticized liquor is sufficiently concentrated and contains sufficient sodium acetate, etc., the sodium acetate will, to a considerable extent, crystallize out from the liquor on cooling, and can thus be recovered in a crystalline state. Such amounts of sodium acetate etc. as are not crystallized out will remain in the liquor and will be returned to the digester. So also, if the concentration of the caustic liquor is not carried sufficiently far to cause separation of sodium acetate etc. it will remain in the causticized liquor and will be returned to the digester; unless acetates, etc. have been otherwise removed.

If any of the alumina is precipitated as aluminum acetate, during the carbonation of the black liquor, this will not interfere with the use of the precipitated alumina, as the subsequent destructive distillation will give a suitable mixture of carbon and alumina.

If the sodium acetate etc. is not produced in sufficient amount during one digestion to make it profitable to recover it from the liquor, it can be returned with the concentrated and causticized liquor to the digester and permitted to build up in this way, by returning the liquor one or more times, until there is enough sodium acetate, etc. in the black liquor produced by a subsequent operation to make it profitable to separate it, or to separate out any excess of it. Insofar as the sodium acetate etc., undergoes change in the digester, when returned with the causticized liquor, for example, into the form of sodium oxalate or other causticizible sodium compound, the causticizing of the liquor with lime will convert such compounds into caustic soda which is thus made available in the further carrying out of the soda pulp process.

The wood commonly treated by the soda pulp process is poplar; and it is one advantage of the present invention that it enables larger amounts of bass wood and other woods of the same type to be utilized than have heretofore been utilizable to advantage, owing to the excessive soda losses occurring when these woods are used and to difficulties due to foaming of the black liquor during concentration. Objectionable foaming and excessive soda losses are largely overcome by the present invention owing to the removal of precipitatable organic matter from the black liquor before concentration. The present invention, therefore, makes possible the treatment of cellulose-bearing materials which could not be treated economically, or which could be treated only with less advantage, according to the common methods of treatment.

So also, the present invention takes advantage of the free caustic soda of the black liquor, as well as its precipitatable organic matter, and utilizes these in the treatment of aluminous material for the production of purified alumina in intimate admixture with the precipitated organic matter, and, ultimately, after destructive distillation, intimate admixture with carbon. The treatment of the black liquor is thus advantageously combined with the treatment of the aluminous material.

The aluminous material (preferably amorphous) which is used as the source of the alumina may vary. Instead of using clay, however, other aluminous materials, such as slate, sericite, leucite, feldspars, or certain ashes from anthracite coal which have undergone heat treatment in the furnace, may be used and suitably treated for the production therefrom of alumina in a form adapted for addition to the black liquor to combine with the free caustic soda thereof to form sodium aluminate. The free caustic soda of the black liquor is thus used to advantage and ultimately recovered in a causticizable form such that it can be used for the production of further amounts of caustic soda for use in the soda pulp process, or for other purposes.

In treating the black liquor, containing the alumina in solution, with carbon dioxide, the carbonation can be carried to the point where all of the alumina and as much as possible of the organic matter are precipitated, or the process may be stopped at any time after complete precipitation of the alumina, even though the precipitable organic matter has not been completely precipitated. Varying amounts of admixed organic matter and aluminum hydroxide can thus be produced, and the process is thus capable of some regulation in this regard. The destructive distillation of the admixed aluminum hydroxide and organic matter will give products of a gaseous or liquid character, or both, which may be recovered as valuable by-products of the operation. If the alumina is obtained as free as possible from organic matter, by avoiding the precipitation of any greater amount of organic matter than is precipitated up to the time of substantially complete precipitation of alumina, the alumina will, of course, be admixed with a correspondingly smaller amount of carbon after destructive distillation.

While, ordinarily, we regard it as more advantageous to utilize the black liquor without preliminary concentration, we may, nevertheless, subject the black liquor to a preliminary concentration before utilizing the free caustic soda thereof for forming the sodium aluminate, so that a more concentrated liquor will be used, and hence a more concentrated solution of caustic soda, although care should be taken that no considerable amount of caustic soda is converted into sodium carbonate during the concentration. When such a concentrated liquor is utilized, the precipitation of the alumina, together with more or less organic matter in admixture, will take place from a more concentrated liquor, and the remaining solution of sodium carbonate or bicarbonate, will also be more concentrated. The process will otherwise be similar to that carried out without such preliminary concentration, although the amount of further concentration will be correspondingly reduced, and a lesser amount of a more concentrated liquor will be handled during the precipitation of organic matter and alumina.

In Figs. 1 and 2 flow sheets representative of the processes of this invention are shown. These flow sheets are to be considered as representative of the invention and it is intended and is to be understood that the invention is not limited thereto.

It will thus be seen that one specific embodiment of the present invention includes an advantageous method of treating aluminous compounds and black liquor, in which constituents of the black liquor are used to advantage in conjunction with purification of aluminous material, and in which various products are obtained from such liquor; as well as the recovery of the greater portion of the soda for reuse. The liquor, after the precipitation of organic matter and alumina therefrom, may be concentrated and then causticized, or causticized and then concentrated, (either alone or after admixture with wash water from the washing of the precipitated alumina and organic matter) to give a caustic liquor which may be directly returned to the digester for further use, with the addition thereto of sufficient added caustic, or of sufficient added sodium carbonate or soda ash before causticizing, to make up for losses.

In referring, in certain of the appended claims, to the steps of concentrating and causticizing the black liquor, after the precipitation of organic matter therefrom, we intend to include these steps whether the concentration precedes or follows the causticizing step, except where the sequence of the steps is definitely indicated.

Instead of causticizing the sodium carbonate or bicarbonate remaining in the liquor after the carbonation and removal of precipitated material we may, in some cases, recover sodium carbonate or bicarbonate as such.

Cellulosic materials other than wood may be treated and the residual liquor subjected to operations similar to those described for residual liquors resulting from cooking wood-chips.

Throughout this application the term "black liquor" is intended to cover all residual liquors, resulting from the treatment of cellulose bearing materials, which contain uncombined alkali metal hydroxide.

We claim:

1. The method of producing purified alumina from aluminum-bearing materials which comprises treating such materials with an aqueous solution of an acid which forms with calcium and aluminum water soluble normal salts and thereby producing a solution containing an aluminum compound of such acid, separating the solution from undissolved matter, treating the solution by means of a compound of calcium capable of precipitating a basic aluminum compound, while leaving the calcium in solution in the form of a soluble compound, separating the resulting solution from the precipitated compound of aluminum, dissolving the aluminum compound in liquor containing sodium hydroxide to form sodium aluminate, separating the sodium aluminate solution from undissolved matter and treating the sodium aluminate liquor to precipitate a basic aluminum compound.

2. The method of producing purified alumina from aluminum-bearing materials which comprises treating such materials with an aqueous solution of an acid which forms with calcium a water soluble normal salt with resulting production of a solution containing an aluminum compound of such acid, separating the solution from undissolved matter, treating the solution by means of a compound of calcium capable of precipitating a basic aluminum compound, while leaving the calcium in solution in the form of a soluble compound, separating the resulting solution from the precipitated compound of aluminum, dissolving the aluminum compound in liquor containing sodium hydroxide to form sodium aluminate, separating the sodium aluminate solution from undissolved matter and treating the sodium aluminate liquor to precipitate a basic aluminum compound, treating the solution of the water soluble calcium compound by means of sulfuric acid to form calcium sulfate and to regenerate an acid capable of use in the first step of the process and employing the regenerated acid for the treatment of further amounts of aluminum-bearing material.

3. The method of producing alumina from aluminum-bearing silicates which comprises treating the silicate with an aqueous solution of an acid which forms with calcium and aluminum water soluble salts, and with a regulated amount of a fluorine-bearing compound, with resulting production of a solution containing an aluminum compound of such acid, separating the solution from undissolved matter, treating the solution by means of a compound of calcium capable of precipitating a basic aluminum compound, while leaving the calcium in solution in the form of a soluble compound, separating the resulting solution from the precipitated compound of aluminum, dissolving the aluminum compound in liquor containing sodium hydroxide to form sodium aluminate, separating the sodium aluminate solution from undissolved matter and treating the sodium aluminate liquor to precipitate a basic aluminum compound.

4. The method of producing alumina from aluminum-bearing silicates which comprises treating the silicate with an aqueous solution of an acid which forms with calcium and aluminum water soluble salts, and with a regulated amount of a fluorine-bearing compound, with resulting production of a solution containing an aluminum compound of such acid, separating the solution from undissolved matter, treating the solution by means of a compound of calcium capable of precipitating a basic aluminum compound, while leaving the calcium in solution in the form of a soluble compound, separating the resulting solution from the precipitated compound of aluminum, dissolving the aluminum compound in liquor containing sodium hydroxide to form sodium aluminate, separating the sodium aluminate solution from undissolved matter and treating the sodium aluminate liquor to precipitate a basic aluminum compound, treating the solution of the water soluble calcium compound by means of sulfuric acid to form calcium sulfate and to regenerate an acid capable of use in the first step of the process and employing the regenerated acid for the treatment of further amounts of aluminum-bearing material.

5. The method of producing purified alumina from aluminum-bearing materials, which comprises treating such materials with hydrochloric acid to form a solution containing aluminum chloride, separating the aluminum chloride solution from undissolved matter, treating the solution with a compound of calcium capable of precipitating a basic aluminum compound and of forming calcium chloride in solution, separating the solution from the precipitate, treating the precipitated aluminum compound with a solution containing sodium hydroxide to form a sodium aluminate solution, separating the solution from undissolved material, and treating the sodium aluminate solution to precipitate a basic compound of aluminum.

6. The method of producing purified alumina from aluminum-bearing materials, which comprises treating such materials with hydrochloric acid to form a solution containing aluminum chloride, separating the aluminum chloride solution from undissolved matter, treating the solution with a compound of calcium capable of precipitating a basic aluminum compound and of forming calcium chloride in solution, separating the solution from the precipitate, treating the precipitated aluminum compound with a solution containing sodium hydroxide to form a sodium aluminate solution, separating the solution from undissolved material, and treating the sodium aluminate solution to precipitate a basic compound of aluminum, treating the solution of calcium chloride with sulfuric acid to form calcium sulfate and regenerate hydrochloric acid and employing the regenerated hydrochloric acid for treating further amounts of aluminum-bearing material.

7. The method of producing purified alumina from aluminum bearing material which comprises treating such materials with hydrochloric acid to produce a solution containing aluminum chloride, separating the aluminum chloride solution from undissolved material, treating the solution of aluminum chloride with a calcium salt of a volatile acid, that is capable of precipitating a compound of aluminum from a solution of sodium aluminate, under conditions to drive off the volatile acid and precipitate a basic compound of aluminum and form a solution containing calcium chloride, separating the solution from the precipitate, treating the precipitated aluminum compound by means of a solution containing sodium hydroxide to form a sodium aluminate solution, separating the solution from the undissolved material, and treating the sodium aluminate solution to precipitate a basic compound of aluminum, said treatment including treatment of the liquor by the volatile acid set free in a preceding step of the process.

8. The method of producing alumina from aluminum bearing material which comprises treating the material with nitric acid, separating the solution from the residue, treating the solution so obtained with an alkaline reagent to bring about precipitation of a basic aluminum compound from the solution, adding such compound to a caustic soda-containing liquor to form alkali metal aluminate with the free caustic alkali thereof, separating the resulting solution from the insoluble impurities whereby to free the alkali metal aluminate from insoluble impurities and precipitating alumina from the latter solution.

9. The method of producing alumina and aluminum bearing silicate which comprises treating the silicate with nitric acid and a regulated amount of a fluorine compound, separating the solution from the residue, and treating the solution with an alkaline reagent to bring about precipitation of a basic aluminum compound from the solution, adding such compound to liquor that contains an alkali metal by hydroxide to form alkali metal aluminate with the free caustic alkali thereof, separating the resulting solution from insoluble impurities and precipitating alumina from the resulting solution.

10. The method of treating material that contains a compound of aluminum, which comprises treating the material with an aqueous solution that contains an acid which is capable of reacting with calcium hydroxide to form a water-soluble normal calcium salt, with resulting production of a solution containing an aluminum compound of such acid, separating the solution from undissolved matter, treating the solution by means of material that includes a compound of calcium capable of precipitating a basic aluminum compound from the solution, thereby forming in the solution a calcium compound of the said acid, separating the resulting solution from undissolved matter, treating the solution with sulfuric acid-containing material, thereby forming calcium sulfate and producing in the solution some of the first-mentioned acid, separating the resulting acid solution from calcium sulfate thus formed, and treating a further amount of the first-mentioned material with such acid solution.

11. The method of treating material that contains a compound aluminum, silica and an alkali metal compound, which comprises treating the material with an aqueous solution that contains an inorganic acid which is capable of reacting with calcium hydroxide to form a water-soluble normal calcium salt, with resulting production of a solution containing an aluminum compound and an alkali metal compound of such acid, separating the elution from undissolved matter, treating the solution by means of material that includes a compound of calcium capable of precipitating a basic aluminum compound from the solution, thereby forming in the solution a calcium compound of the said acid and leaving in the solution an alkali metal salt of the said acid, separating the resulting solution from undissolved matter, treating the solution with sulfuric acid containing material, thereby producing calcium sulfate, and separating the resulting solution from calcium sulfate thus formed.

12. The method of treating material that contains a compound of aluminum, silica and a potassium compound, which comprises treating the material with an aqueous solution that contains nitric acid, with resulting production of a solution containing a nitrate of aluminum and a nitrate of potassium, separating the solution from undissolved matter, treating the solution by means of material that includes a compound of calcium capable of precipitating the basic aluminum compound from the solution, thereby forming in the solution calcium nitrate and leaving in the solution potassium nitrate, separating the resulting solution from undissolved matter, treating the solution with sulfuric acid containing material, thereby producing calcium sulfate, and separating the resulting solution from calcium sulfate thus formed.

13. The method of treating material that contains a compound of aluminum, silica and an alkali metal compound, which comprises treating the material with an aqueous solution that contains an inorganic acid which is capable of reacting with calcium hydroxide to form a water-soluble normal calcium salt, with resulting production of a solution containing an aluminum compound of such acid and an alkali metal compound of such acid, separating the solution from undissolved matter, treating the solution by means of material that includes a compound of calcium capable of precipitating a basic aluminum compound from the solution, thereby forming in the solution a calcium compound of the said acid and leaving in the solution an alkali metal compound of such acid, separating the resulting solution from undissolved matter, treating the solution with sulfuric acid-containing material, thereby forming calcium sulfate and producing in the solution some of the first-mentioned acid, separating the resulting acid solution from calcium sulfate thus formed; and treating a further amount of the first-mentioned material with the resulting acid solution which contains an alkali metal compound of such acid, thereby producing in the solution an aluminum compound of such acid and producing therein a further amount of alkali metal compound of such acid.

14. The method of treating furnace-slag that contains silica and a compound of alumina, which comprises treating such slag by means of an acid liquor that contains an acid radicle which forms with calcium a water-soluble normal calcium salt, decomposing an aluminum compound of such acid radicle and precipitating a basic compound of aluminum from the liquor by means of basic calcareous material thereby forming in the liquor a water-soluble calcium salt of such acid radicle, separating the liquor from the precipitated compound of aluminum, treating with sulfuric acid-containing material a liquor that contains a calcium salt of the first-mentioned acid radicle to regenerate the first-mentioned acid and form calcium sulfate, separating the regenerated acid liquor from calcium sulfate thus formed, and treating further amounts of such material that includes silica and a compound of alumina by means of the regenerated acid liquor to dissolve alumina away from silica.

15. The method of treating furnace-slag that contains silica and a compound of alumina, which comprises treating such slag with an aqueous liquor that includes an acid chloride, thereby obtaining a chloride of aluminum in the liquor, separating the liquor from undissolved matter including silica, treating the liquor by means of a basic calcareous material, thereby producing calcium chloride in the liquor, separating the liquor from precipitated matter, treating the liquor with sulfuric acid-containing material, thereby forming an acid chloride-containing liquor and forming calcium sulfate, separating the liquor from calcium sulfate thus formed, and treating further amounts of such material which includes silica and a compound of alumina by means of such acid chloride-containing liquor to dissolve alumina away from silica.

16. The method of treating material that contains silica and a compound of alumina, which comprises treating such material with an aqueous liquor that contains hydrochloric acid, thereby obtaining a chloride of aluminum in the liquor, separating the liquor from undissolved matter including silica, treating the liquor by means of a basic calcareous material, thereby precipitating a basic compound of aluminum and producing calcium chloride in the liquor, separating the liquor from undissolved matter, treating the liquor with sulfuric acid-containing material, thereby forming hydrochloric acid in the liquor and forming calcium sulfate, separating the acid liquor from calcium sulfate thus formed, and treating further amounts of such material that contains silica and a compound of alumina by means of such acid liquor to dissolve alumina away from silica.

17. The method of treating material that contains silica and a compound of alumina, which comprises treating such material with an aqueous liquor that contains nitric acid, thereby obtaining a nitrate of aluminum in the liquor, separating the liquor from undissolved matter including silica, treating the liquor by means of a basic calcareous material, thereby precipitating a basic compound of aluminum and producing calcium nitrate in the liquor, separating the liquor from undissolved matter, treating the liquor with sulfuric acid-containing material, thereby forming nitric acid in the liquor and forming calcium sulfate, separating the acid liquor from calcium sulfate thus formed, and treating further amounts of such material that contains silica and a compound of aluminum by means of such acid liquor to dissolve alumina away from silica.

In testimony whereof we affix our signatures.

LINN BRADLEY.
EDWARD P. McKEEFE.